United States Patent [19]

DeSantis et al.

[11] 4,450,127

[45] May 22, 1984

[54] METHOD FOR COMPACTING POWDER MATERIAL WITH ADJUSTABLE DIE AND PUNCH ASSEMBLY

[75] Inventors: Raymond P. DeSantis, Troy; Herbert J. Puffer, Jr., Garden City, both of Mich.

[73] Assignee: PTX Pentronix, Inc., Lincoln Park, Mich.

[21] Appl. No.: 419,827

[22] Filed: Sep. 20, 1982

Related U.S. Application Data

[63] Continuation-in-part of Ser. No. 351,482, Feb. 23, 1982, Pat. No. 4,390,335.

[51] Int. Cl.³ .............................................. C04B 33/32

[52] U.S. Cl. ...................................... 264/56; 264/109; 425/77; 425/78; 425/416; 425/469

[58] Field of Search .................... 264/109, 56; 72/446, 72/447; 425/77, 78, 344, 345, 352, 354, 355, 356, 416, 457, 469, DIG. 35, 324.1, 262

[56] References Cited

U.S. PATENT DOCUMENTS

| | | | |
|---|---|---|---|
| 1,277,985 | 9/1918 | Merrill | 72/447 |
| 3,561,056 | 2/1971 | Smith | 425/78 |
| 3,574,892 | 4/1971 | Smith | 425/78 |
| 3,640,654 | 2/1972 | Smith | 425/78 |
| 3,669,582 | 6/1972 | Smith | 425/78 |
| 3,671,157 | 6/1972 | Smith | 425/78 |
| 3,775,032 | 11/1973 | Smith | 425/78 |
| 3,805,370 | 4/1974 | De Troyer | 425/78 |
| 3,822,974 | 7/1974 | De Santis | 425/78 |
| 3,852,991 | 12/1974 | Poggio | 72/447 |
| 4,053,267 | 10/1977 | De Santis | 425/78 |

FOREIGN PATENT DOCUMENTS 733793 5/1980 U.S.S.R. .

*Primary Examiner*—Donald E. Czaja
*Assistant Examiner*—Mary A. Becker
*Attorney, Agent, or Firm*—Hauke and Patalidis

[57] ABSTRACT

Apparatus and method for compensating uneven gravity filling with powder material of a die cavity formed on the top of a punch reciprocable in a bore in a die plate, the punch having an end face normally parallel to the surface of the die plate. The punch is mounted on an adjustable support member split into portions having each an end face disposed parallel to the end face of the other portion. The two portions have a common surface of junction disposed in a plane at an angle to the parallel end faces. The two portions are rotated together to orient the surface of junction in the direction of inclination of the punch, and the two portions are independently rotated the same amount in opposite directions as a function of the desired angle of inclination of the punch.

2 Claims, 13 Drawing Figures

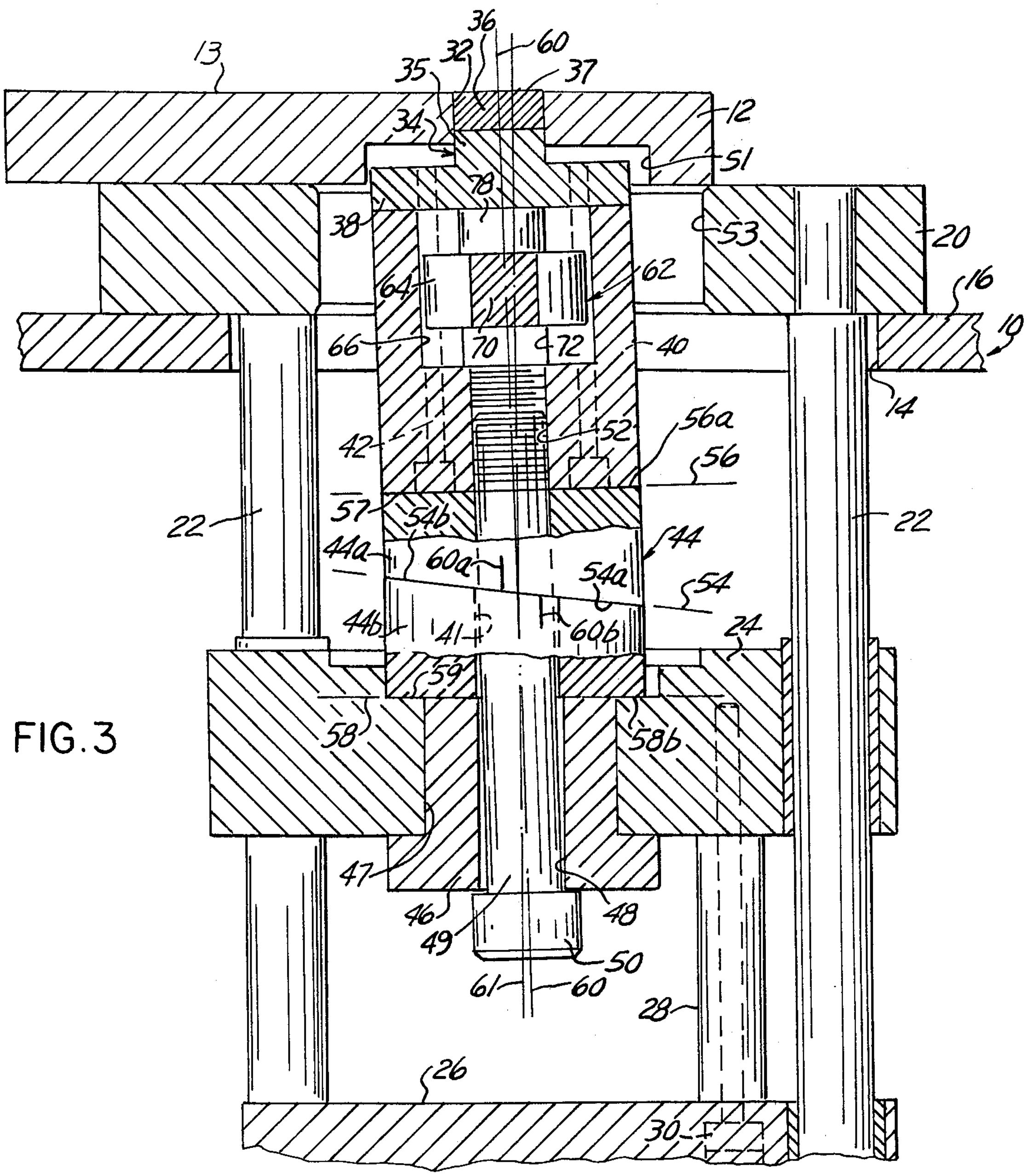
FIG. 3
FIG. 5
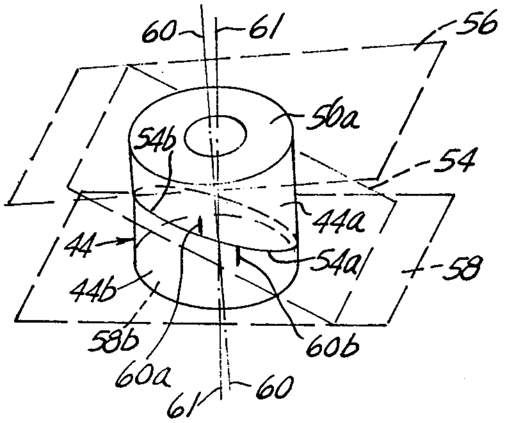
FIG. 4
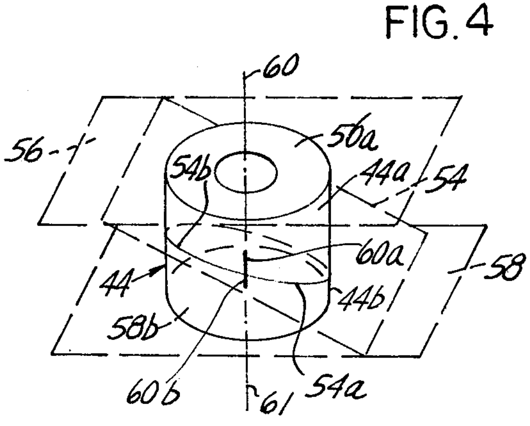

FIG.6
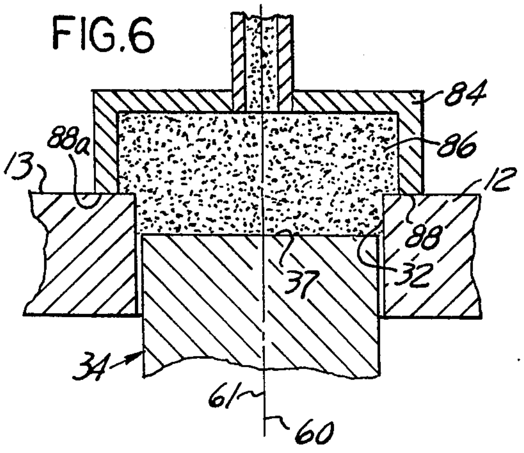
FIG.7
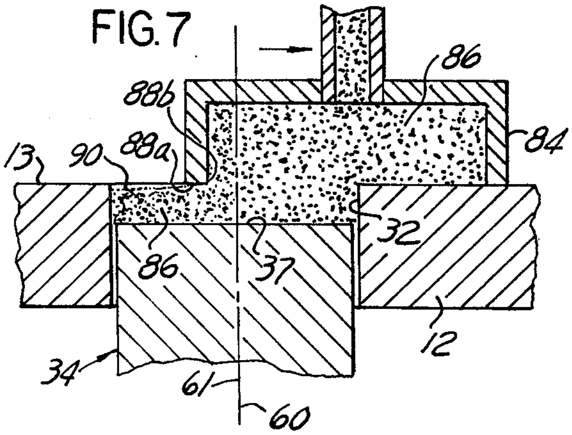
FIG.8
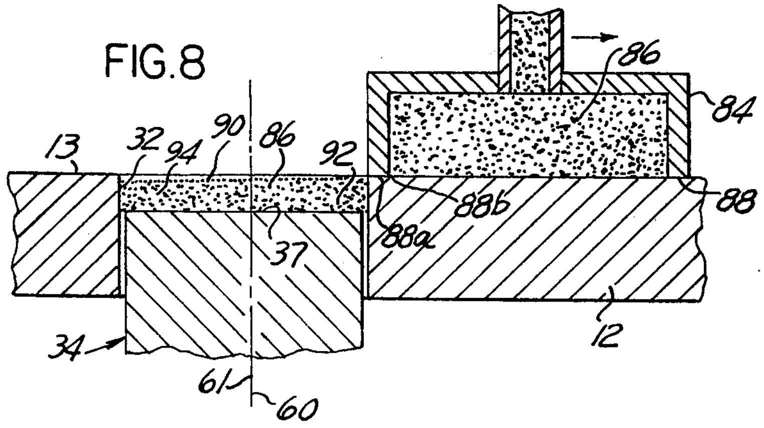
FIG.10
FIG.9
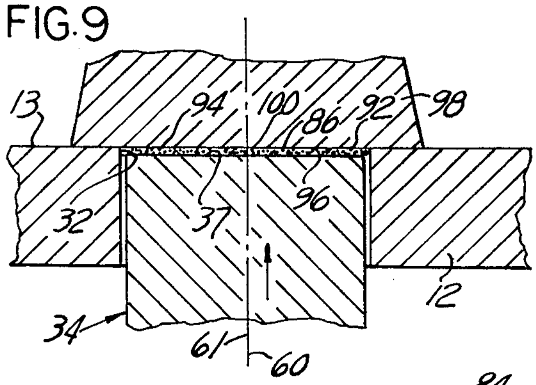
FIG.12
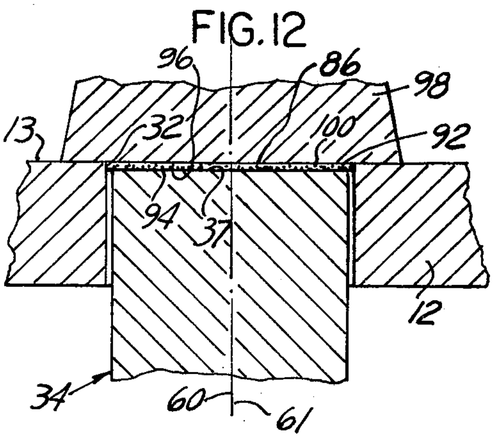
FIG.11
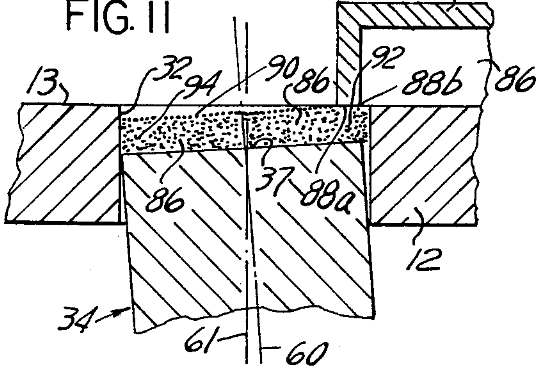
FIG.13

METHOD FOR COMPACTING POWDER MATERIAL WITH ADJUSTABLE DIE AND PUNCH ASSEMBLY

CROSS-REFERENCE TO RELATED PATENTS AND PATENT APPLICATIONS

The present application is a continuation-in-part of application Ser. No. 351,482, filed Feb. 23, 1982 and assigned to the same assignee as the present application, now U.S. Pat. No. 4,390,335, issued June 28, 1983.

The present application is an improvement on the punch and die assemblies for compacting powder material disclosed and claimed in U.S. Pat. Nos. 3,328,840, 3,414,940, 3,561,056, 3,574,892, 3,621,534, 3,640,654, 3,669,582, 3,671,157, 3,775,032, 3,805,370, 3,822,974, 4,053,267 and 4,513,399, all assigned to the same assignee as the present application.

BACKGROUND OF THE INVENTION

The present invention relates to powder material compacting presses, more particularly to an improved die and punch assembly for powder compacting presses and to the method practiced thereby.

In powder compacting presses as disclosed in U.S. Pat. Nos. 3,328,840, 3,344,213, 3,328,842, 3,414,940, 3,561,054, 3,726,622, 3,741,697, 3,775,032, 3,805,370 and 3,822,974, all assigned to the same assignee as the present application, there are disclosed apparatus such as presses and tools for such presses for compacting powder material, such as powdered metal, ferrite, glass and other materials into diverse articles such as toroids, beads, pellets and the like. In the powder compacting apparatus disclosed in the aforementioned patents, the articles are formed in single or multi-cavity dies, in which reciprocable punches are disposed, by compaction of the powder material between the punch end face and an anvil displaceable over the die cavity so as to overlap the die cavity.

A work station positioner assembly, forming part of the press apparatus, is disposed angularly or linearly movable over the die plate and is provided with three separate or integral elements, a powder dispenser unit, an anvil, and a pick-up head. The powder dispenser unit is first positioned over the die cavity to fill the die cavity with a predetermined amount of powder material. The dispenser unit is then removed from above the die cavity, and the anvil unit is in turn positioned over the die cavity and clamped in position. The punch is reciprocated upwardly in the die such as to compact the powder material between the punch end face and the anvil. The anvil is then unclamped from above the die cavity and replaced by the pick-up head as a result of further angular or linear motion of the work station positioner assembly. The punch is reciprocated upwardly so as to eject the compacted article from the die cavity into the pick-up head for transfer to a remote station, or, alternatively, for transfer to a collection station by subsequent motion of the work station positioner assembly.

By way of utilizing standardized punch and die assemblies in the form of interchangeable tool capsules, all adapted to be interchangeably mounted on the press table in an appropriate mounting aperture and held therein by any convenient means such as by mounting bolts or clamps, the remaining of the tool capsule projecting below the press table, with the punch actuating mechanism of the press appropriately connected to the punch actuating plate portion of the tool capsule, it is a simple matter after a production run of a particular part to remove a tool capsule and replace it by another tool capsule for compacting a different part. With the exception of the die, the punches, and the core rods, if any, all the other mechanical parts forming the tool capsule are subject to little or no wear. The die, the punch and the core rods, if any, are however, subject to important load stresses and to wear, as a result of which they may experience dimensional changes, such as a progressive opening of tolerances, and, if subjected to abnormal loads, they may be damaged beyond repair or even break. It is therefore convenient for the user to provide a tool capsule which can be easily dismantled and which provides easy removal of the die plates or of the die bushings, the punches and the core rods, when they become worn or when they break, for replacement by new die plates or die bushings, punches and core rods.

A problem often associated with the production of, for example, relatively thin and wide articles compacted of powder material, is that of obtaining constant density throughout the width of the compacted article. If the density is not constant throughout the width of the article, during "firing" or sintering of the article in a furnace and in the course of cooling after sintering, the internal stresses caused by shrinkage of the article may cause the article to warp or, as it is commonly referred to, to become "banana-shaped". Such warpage, which is directly caused by the uneven density of the compacted powder particles, results from uneven filling of the die cavity by the powder dispenser unit. The powder dispenser unit is generally in the form of a dome or bell-shaped structure, forming part of the work station positioner assembly, which is supplied in powder material from a primary powder hopper through a flexible conduit. The edge, or lip, of the dome-shaped hollow structure, forming the powder dispenser unit, is constantly in engagement with the surface of the die plate, and the interior of the powder dispenser unit is constantly filled with powder material. When placed over the die cavity, with the punch retracted to the "fill" position, some amount of powder falls by gravity in the die cavity on the top of the punch face, and when the powder dispenser unit is displaced away from the die cavity, the trailing edge or lip of the powder dispenser unit wipes the top of the powder material in the die cavity on a level desirably flush with the die plate surface, such that a predetermined mass of powder material remains in the die cavity, with its top level ideally evenly disposed in the same plane as the plane of the die plate surface. However, the friction between the trailing edge or lip of the powder dispenser unit and the powder particles in the die cavity in the course of the travel of the powder dispenser unit across the top of the die cavity tends to displace the powder particles in the die cavity in the direction of travel of the powder dispenser unit, with the result that the leading side of the die cavity tends to become underfilled while the trailing side of the die cavity tends to overfill, and the wiping action of the trailing edge or lip of the powder dispenser unit tends to slightly prepack the powder particles in the direction of travel of the powder dispenser unit, and more so at the trailing side of the die cavity. The result is that, when the anvil is placed over the die cavity, and further frictional engagement may have taken place between the face of the anvil linearly moving in the same direction as the powder dispenser unit, further migration of powder particles may take place from the leading side of the die cavity to the trailing side with additional concentration of powder particles towards the trailing side. During compaction of the article through the subsequent upward motion of the punch face towards the anvil face, resulting in compacting the article within, for example, substantially parallel faces, the density of the compacted article is greater at the trailing side of the die cavity than it is at the leading side.

It has been discovered that uneven filling of the die cavity with powder material may be compensated for by slightly inclining the face of the punch towards the leading side of the die cavity. Although the punch could be made with a face disposed at a slight angle, such a structure is not convenient as the uneven filling of the die cavity varies in accordance with a plurality of interreacting and unpredictable variable factors such as atmospheric moisture, slight variations in the quantity or quality of the binder mixed with the powder material, variations in the size of the powder particles, etc.

SUMMARY OF THE PRESENT INVENTION

The present invention remedies the inconveniences of uneven packing or filling of the die cavity in a punch and die assembly for compacting relatively thin and wide articles, which may be subjected to warpage during subsequent firing or sintering after compaction, by providing adjustment of the punch such that its axis is no longer exactly perpendicular to the plane of the die plate surface, with the result that during filling of the die cavity and subsequent displacement of the powder dispenser unit from over the die cavity, substantially the same quantity of powder material is dropped on the top of the punch face throughout the width of the die cavity per unit of width of the die cavity.

These and other objects of the present invention will become apparent to those skilled in the art when the following description of the best mode contemplated for practicing the invention is read in conjunction with the accompanying drawing wherein:

BRIEF DESCRIPTION OF THE DRAWING

FIG. 3 is a view similar to FIG. 2, but showing the punch member adjusted at an angle;

FIGS. 4 and 5 are schematic perspective views useful is explaining the principle and function of the present invention;

FIGS. 6–8 are schematic illustrations of a sequence of steps, during filling of the die cavity with powder material, useful in explaining the inconveniences of the prior art;

FIG. 9 is a view similar thereto but illustrating the compacting step;

FIG. 10 is a section through the article obtained by the arrangement of elements of FIGS. 6–9;

FIG. 11 is a schematic illustration similar to FIG. 8, but incorporating the present invention;

FIG. 12 is a view similar to FIG. 11, but illustrating the compacting step; and

FIG. 13 is a section through an article compacted according to the method and apparatus of the invention.

DETAILED DESCRIPTION OF THE PREFERRED EMBODIMENT

Figure 1:
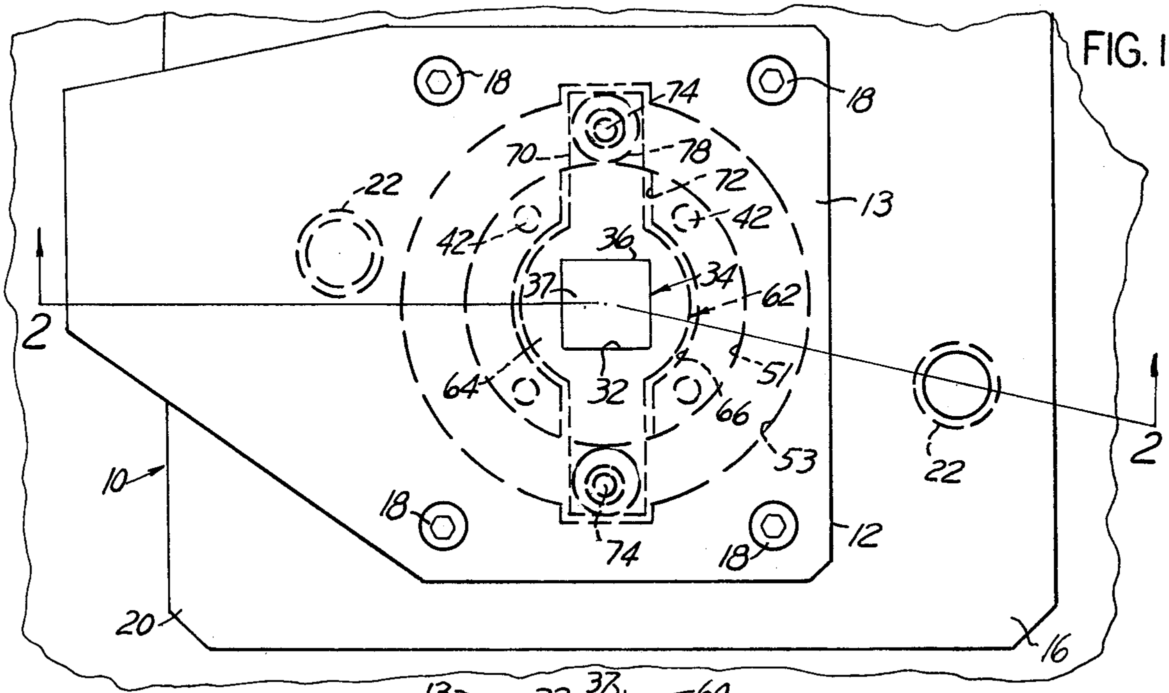
FIG. 1 is a top plan view of a die and punch assembly, or tool capsule, according to the present invention.
Figure 2:
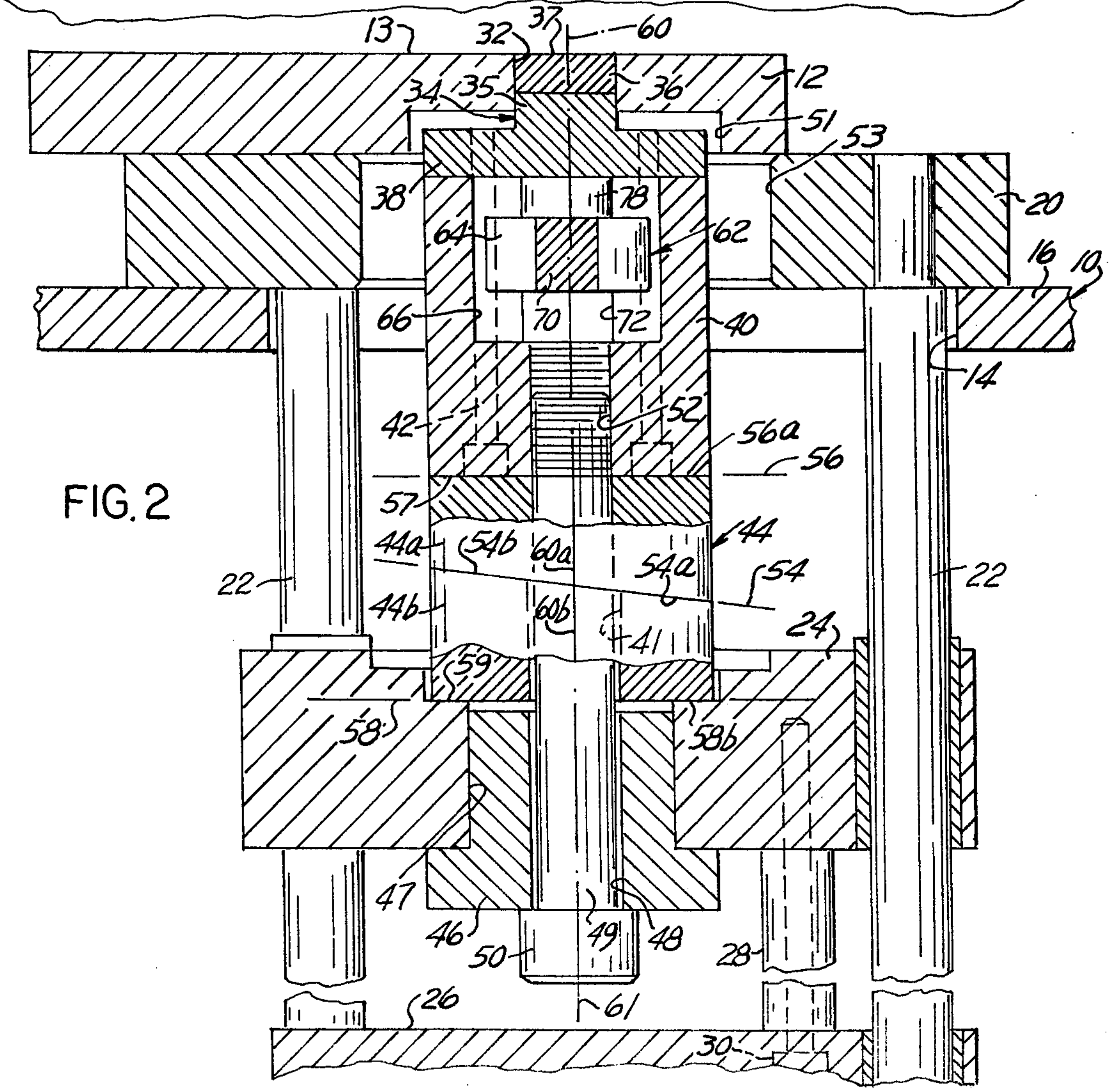
FIG. 2 is a section along line 2—2 of FIG. 1.

Referring to the drawing, and more particularly to FIGS. 1 and 2 thereof, a die and punch assembly 10, or tool capsule, for example according to the invention disclosed in copending prior application Ser. No. 351,482 now U.S. Pat. No. 4,390,335 comprises a die plate 12 having a top plane surface 13. The die plate 12 is adapted for mounting in an opening 14 in the table 16 of a powder compacting apparatus, or press (not shown). The die plate 12 is mounted by means of countersunk screws 18, FIG. 1, on a spacer plate 20 in turn directly bolted or clamped, in a manner not shown, on the top of the table 16 over the opening 14. A pair of parallel spaced apart guide posts 22, mounted below the spacer plate 20, slidably support and guide a punch support plate 24 and a punch actuating platen 26 disposed parallel to each other and in spaced-apart relationship. The punch actuating platen 26 is mechanically connected to the press lower ram, not shown, for reciprocation therewith, and is rigidly connected to the punch support plate 24 by means of spacers such as tubular spacers 28, only one of which is shown, and bolts 30.

The die plate 12, made of heat-treated tool steel or of a metallic carbide, for example, has a die opening or cavity 32 in which is reciprocably disposed a punch 34 which may be made of solid construction but which, preferably, has a top block or insert 36 made of extra hard material such as a metal carbide or the like having a flat face 37, and a body portion 35. If so desired, the die plate 12 instead of being directly provided with a die opening 32 may be provided with a fitted die bushing of extra hard material such as a carbide, in turn provided with the die opening or cavity 32.

The punch 34, which, in the example of structure illustrated, has a substantially square body portion 35 and insert 36, is formed integral with a circular plate 38 bolted on the top of a generally cylindrical tubular punch base 40 by way of socket head bolts 42. The bottom of the punch base 40 is disposed on the top of a split adjusting bushing 44 and is solidly attached to the punch support plate 24 by means of a shouldered retainer bushing 46 disposed with little, if any, clearance in a bore 47 in the punch support plate 24. The retainer bushing 46 has a central bore 48 through which is passed, with clearance, the body 49 of a bolt 50 threading through a centrally disposed threaded bore 52 through the bottom of the cylindrical punch base 40. The die plate 12 has a cylindrical recess 51 formed on its lower surface to provide clearance around the punch circular plate 38, and the die spacer plate 20 has an opening 53 providing passage therethrough of the punch base 40.

The adjusting bushing 44 is split along a plane 54 such as to form two bushings 44*a* and 44*b* having respectively angled faces 54*a* and 54*b* normally engaged with each other, the plane 54 being disposed at an angle to a horizontal plane and perpendicular to the plane of the drawing, FIG. 2. A first horizontal plane 5 is arbitrarily represented at FIGS. 2 and 4 only by a plane 56, which is defined at the junction between the top face 56*a* of the half bushing 44*a* and the bottom face 57 of the cylindrical punch base 40. Another horizontal plane 58 is also defined, at FIGS. 2–5, at the junction between the end face 58*b* of the half bushing 44*b* and an annular surface 59 on the top of the punch support plate 24. A third horizontal plane is the top surface 13 of the die plate 12. In the position illustrated at FIG. 2 the punch 34 is disposed with its centerline 60 accurately vertical and thus coinciding with the vertical axis 61, which is perpendicular to the horizontal planes 58 and 56 and to the surface 13 of the die plate 12 when two position reference markings are aligned, such as scribelines 60*a* and 60*b*, respectively disposed on the peripheral surface of the half bushing 44*a* and on the peripheral surface of the half bushing 44*b*.

In structures wherein it is desired to provide the article compacted of powder material with apertures, the punch and die assembly 10 also comprises core rods, not shown herein for the sake of simplification of description of the invention, which are at all times held stationary during reciprocation of the punch 34, and which are disposed through appropriate bores through the punch. In punch and die assemblies using core rods, the core rods are supported at an end by a block 62 disposed below the punch support plate 38. The block 62 has a main body portion 64 freely disposed within a recess 66 in the punch base 40 and has a pair of diametrally opposed arms 70, FIGS. 1–2, laterally projecting through lateral slots 72 formed in the wall of the tubular punch base 40. The core rod support block 62 is thus mounted, bridge-like fashion, below the die plate 12 by means of a pair of bolts 74, FIG. 1, passed through vertically disposed bores proximate the end of the arms 70 and through the interior of tubular spacers 78, the end of each bolt 74 threading through an appropriate threaded bore in the die plate 12. In this manner, when the punch support plate 24 supporting the punch base 40 on the top of which the punch 34 is mounted is reciprocated, the core rod support block 62 remains stationary.

The present invention provides for inclining the axis of the punch 34 to a position such that its longitudinal axis 60 is no longer coinciding with a vertical axis 61 and its end face 37 is no longer parallel to a horizontal plane or to the top surface 13 of the die plate 12. To effectuate such an adjustment, the bolt 50 is loosened and the adjusting half bushings 44*a* and 44*b* are manually rotated a few degrees in opposite directions from the reference position illustrated at FIG. 2, wherein the reference scribelines 60*a* and 60*b* are aligned, to the position illustrated at FIG. 3 wherein the scribelines 60*a* and 60*b* are no longer aligned, and the bolt 50 is retightened. In the position of FIG. 3, because the adjusting half bushings 44*a* and 44*b* have been rotated of the same angular amount in opposite directions relative to the reference position, the angle of tilting of the longitudinal axis 60 of the punch 34 has been effected in the plane of the drawing, the horizontal plane 58 remains in its original position, but the plane 56 has been tilted towards the left, as seen in the drawing, with the result that the punch 34 has been tilted to the left for the purpose to be indicated hereinafter. The vertical axis 61 and the longitudinal axis 60 of the punch 34 no longer coincide, FIGS. 3 and 5, and the punch support member 40 and the holding bolt 50 are also tilted toward the left.

The amount of tilt illustrated at FIG. 3 and at FIG. 5 is grossly exaggerated for the sake of understanding of the principle of the invention. In reality, the amount of tilting would be hardly noticeable by the naked eye, as it would amount only to a few seconds of a degree. Typically, the clearance between the wall of the die cavity 32 and the peripheral wall of the punch insert 36 is of the order of 0.001 in. (0.025 mm). Inclining the longitudinal axis 60 of the punch 34 an amount corresponding to 0.0005 in. (0.0127 mm) has experimentally been discovered to be sufficient to compensate for uneven filling of the die cavity above the punch face 37 during compacting of a substantially square article or workpiece about 0.5 in. (13 mm) wide and 0.060 thick (1.55 mm) after compacting.

With further reference to FIGS. 4–5, it can be seen that the plane 54 of engagement of the faces 54*a* and 54*b* of the half bushings 44*a* and 44*b*, respectively, and consequently the direction in which further adjustment will incline the longitudinal axis 60 of the punch 34 is determined by, or results from, manually rotating both half bushings 44*a* and 44*b* as a unit, the indexing scribelines 60*a* and 60*b* remaining aligned. Once the direction of inclination is determined in such manner, the half bushing 44*a* and 44*b* are rotated in opposite directions in equal angular distances such as to incline the plate 56 of the upper face 56*a* of the half bushing 44*a* an appropriate amount, FIG. 5, with the result that the angle that the longitudinal axis 60 of the punch 34 makes with the horizontal plane 58 is a function of the opposite angular displacements of rotation of the half bushings 44*a* and 44*b*.

Although infinitesimal, the adjustment provided by the split adjustment bushing 44 has been found to be fully adequate to remedy the problem illustrated schematically, and in an exaggerated manner, at FIGS. 6–10. The die plate 12 provided with the die cavity 32, FIG. 6, has an upper surface 13 which is disposed substantially in a horizontal plane or, in other words, parallel to the plane 58, FIGS. 2–5 and to the plane 56, FIGS. 2 and 4. In one position of the work station positioner, not shown, a powder dispenser unit 84 is positioned over the die cavity 32, the flat end face 37 of the punch 34 being retracted to an appropriate position corresponding to the die cavity filling position. The powder material dispenser unit 84 is in the form of an open bottom enclosure filled with powder particles 86, generally mixed with a small quantity of binder, supplied by gravity from a powder material hopper, not shown. The bottom edge or lip 88 of the powder dispenser unit 84 is constantly in sliding engagement with the surface 13 of the die plate 12. In the position schematically illustrated at FIG. 6, the powder particles 86 filling the interior of the powder dispensing unit 84 also fill the die cavity 32. Subsequently, the powder dispenser unit 84 is linearly or arcuately displaced, for example in the direction indicated by the arrow, FIG. 7, such that the trailing edge or lip 88*a* of the powder dispenser unit 84 should wipe the surface of the mass of powder particles in the die cavity 32 relatively even and relatively flush with the surface 13 of the die plate 12. However, because the front corner 88*b* of the trailing edge 88*a* of the powder dispenser unit 84 pushes the powder particles 86 at the surface of the mass of powder particles 86 in the die cavity 32 in the direction of displacement of the powder dispenser unit 84, and because of frictional inner-reaction between the moving powder particles still contained in the interior of the dispenser unit 84 and the stationary powder particles at the surface of the mass of powder in the die cavity 32, increased by the stickiness of the binder, the level of powder particles 86 in the die cavity 32 tends to be slanted, as shown at 90, due to the tendency of the powder particles to be more tightly packed together progressively toward the trailing side, or right side, 92 of the die cavity 32. The result is that, when the powder dispenser unit 84 has been fully displaced away from over the die cavity 32, FIG. 8, quantitatively more powder particles 86 are disposed over the face 37 of the punch 34 at the trailing side 92 than at the leading side, or left side, 94 of the die cavity. This effect, arbitrarily represented at FIG. 8 by the slanted level 90 of the surface of the powder particles 86 in the die cavity 32, causes the mass of powder particles 86 in the die cavity 32 to be thicker at the trailing side 92 than at the leading side 94 of the die cavity.

During compaction of the mass of powder particles 86 in the die cavity 32 between the punch end face 37 and the face 96 of an anvil 98 subsequently disposed over the die cavity, FIG. 9, the density of the compacted article 100 progressively increases from the portion corresponding to the leading side 94 of the die cavity 32 to the trailing side 92 thereof. During firing of the article 100 in a sintering furnace, and during cooling after sintering, the internal stresses to which the article is subjected result in causing the article 100 to become warped or curved, as schematically illustrated in an exaggerated manner at FIG. 10.

As illustrated at FIG. 11, also in a very grossly exaggerated manner, inclining the axis 60 of the punch 34 such that the face 37 of the punch is disposed at an angle to the plane of the surface 13 of the die plate 12, the scrubbing effect of the trailing edge or lip **88*a* of the powder dispenser unit 84 tends to fill the die cavity 32 to a level 90 which is also at a slant rather than being parallel with the plane of the upper surface 13 of the die plate 12, such that by accurate adjustment of the inclination of the punch 34 to dispose the punch face 37 parallel to the level 90 of powder dispensed in the die cavity 32, FIG. 11, the density of the compacted article 100, FIGS. 12 and 13, is substantially equal throughout its width. During the compacting step, FIG. 12, in view of the high compacting forces developed by the press punch actuating mechanism, and due to the relative length of the punch assembly and the elastic flexion of the diverse elements, and more particularly of the punch actuating mechanism and of the punch holder, the punch face 37 tends to rock the other way and become parallel to the face 96 of the anvil 98 at the end of the stroke of the punch 34 compacting the article 100 in the die cavity 32 between the punch face 37 and the anvil face 96. The results achieved are that, with proper inclination of the longitudinal axis 60 of the punch 34, the density of the powder particles in the compacted article 100 is substantially constant throughout the width of the article, and the article 100, after sintering or firing, and cooling is substantially straight, as shown at FIG. 13**.

The amount of inclination of the longitudinal axis 60 of the punch 34, and the direction of inclination are determined experimentally by running a small batch of compacted articles after each set-up, sintering the batch of articles, and measuring the straightness of the articles until the best performance is achieved.

It will be appreciated by those skilled in the art that although the dimensions involved, as previously mentioned, are infinitesimal and within the clearances built in the punch and die assembly which, also as previously mentioned, are grossly exaggerated in the drawing, it may be necessary for certain operations where more compensation is required to open the clearances slightly from those indicated by the numerical example hereinbefore given, by one or two orders of magnitude, and to make the bore in the die 12 forming the die cavity 32 on the top of the face 37 of the punch 34, with a slight taper at its portion below the die cavity with the punch in the fill position such as to accommodate inclination of the punch 34 beyond the limits allowed within normal assembly clearances.

Having thus described the invention by way of an example of structure well designed to provide the benefits of the method of the invention, what is claimed as new is as follows:

1. In a method for compacting powder material in a die cavity in a die plate having an upper surface, a bore through said die plate, a punch having an end slidably disposed in said bore in said die plate, said punch having an end face normally substantially parallel to said die plate upper surface, a punch base member, a reciprocal platen supporting said punch base member, and means for reciprocating said platen, said die cavity being defined in said bore between said punch end face and said die plate upper surface, said method comprising filling said die cavity with powder material by means of a dispenser unit in the form of an open bottom enclosure having a bottom edge in sliding engagement with said upper surface, displacing said powder dispenser unit for wiping said powder material in said die cavity to a surface level relatively flush with said die plate upper surface, subsequently placing an anvil face over said die cavity and compacting said powder material in said die cavity between said anvil face and said punch end face for forming articles compacted of said powder material, wherein uneven filling of said die cavity prior to compacting said powder material in said die cavity causes the compacted articles to warp during sintering, said uneven filling being caused by said wiping action of the bottom edge of said powder material dispenser unit upon said powder material surface level, said improvement comprising adjustably inclining said punch for disposing said punch end face non-parallel to said die plate upper surface and substantially parallel to the surface level of powder material after wiping of said surface level by said bottom edge of said powder material dispenser unit, compacting a plurality of articles, sintering said articles, and readjusting the inclination of said punch and repeating said compacting, sintering and measuring steps until the least amount of warpage of said articles after sintering is achieved.

2. The method improvement of claim 1 wherein said punch is adjustably inclined in amount and direction of inclination.

* * * * *

UNITED STATES PATENT AND TRADEMARK OFFICE
CERTIFICATE OF CORRECTION

PATENT NO. : 4,450,127
DATED : May 22, 1984
INVENTOR(S) : Raymond P. DeSantis and Herbert J. Puffer, Jr.

It is certified that error appears in the above-identified patent and that said Letters Patent are hereby corrected as shown below:

Column 4, line 61 delete "5"

Signed and Sealed this

*Ninth* Day of *October 1984*

[SEAL]

*Attest:*

GERALD J. MOSSINGHOFF

*Attesting Officer* *Commissioner of Patents and Trademarks*

]